(12) United States Patent
Banfield et al.

(10) Patent No.: US 12,522,876 B2
(45) Date of Patent: Jan. 13, 2026

(54) INTEGRATED METHOD FOR ARTHROPOD ACQUISITION, PROCESSING, IDENTIFICATION AND DETERMINATION OF PATHOGEN BURDEN

(71) Applicant: BanfieldBio, Inc., Woodinville, WA (US)

(72) Inventors: Michael Gilbert Banfield, Woodinville, WA (US); John Harvey Borden, Burnaby (CA)

(73) Assignee: BanfieldBio, Inc., Woodinville, WA (US)

( * ) Notice: Subject to any disclaimer, the term of this patent is extended or adjusted under 35 U.S.C. 154(b) by 0 days.

(21) Appl. No.: 18/418,045

(22) Filed: Jan. 19, 2024

(65) Prior Publication Data

US 2025/0236918 A1   Jul. 24, 2025

(51) Int. Cl.
*C12Q 1/6888* (2018.01)
*C12Q 1/6883* (2018.01)

(52) U.S. Cl.
CPC ......... *C12Q 1/6888* (2013.01); *C12Q 1/6883* (2013.01)

(58) Field of Classification Search
CPC ............................ C12Q 1/6888; C12Q 1/6883
See application file for complete search history.

(56) References Cited

U.S. PATENT DOCUMENTS

| | | | |
|---|---|---|---|
| 5,167,955 A * | 12/1992 | Teale | A01N 35/06 |
| | | | 424/84 |
| 6,267,953 B1 | 7/2001 | Bernier et al. | |
| 8,808,721 B2 | 8/2014 | Banfield et al. | |
| 8,940,287 B2 | 1/2015 | Birmingham et al. | |
| 10,098,337 B2 | 10/2018 | Yans | |
| 10,299,470 B2 | 5/2019 | Kovacs et al. | |
| 10,702,250 B2 | 7/2020 | Lidgard et al. | |
| 2016/0078196 A1 * | 3/2016 | Malbon, Jr. | G16H 10/40 |
| | | | 705/3 |

FOREIGN PATENT DOCUMENTS

CN   106520518 A * 3/2017 ........... C12Q 1/6806

OTHER PUBLICATIONS

Anderson, G.S. et al. 1991. Culicoides obsoletus as a causal agent of culicoides hypersensitivity (sweet itch) in horses in British Columbia. Journal of Medical Entomology 28: 685-693.
Berger, J.J. et al. 2018. Tick-Borne Disease Working Group: 2018 Report to Congress. U.S. Department of Health and Human Services, Office of the Assistant Secretary for Health Washington, DC.
Bernier, U.R. et al. 2000. Analysis of human skin emanations by gas chromatography/mass spectrometry. 2. Identification of volatile compounds that are candidate attractants for the yellow fever mosquito (*Aedes aegypti*). Analytical Chemistry 72: 747-756.
Birmingham, A.L. et al. 2011. A new trap and lure for *Drosophila melanogaster* Meigen (Diptera: Drosophilidae). Journal of Economic Entomology 104: 1018-1023.
Borror, D.J. et al. 1989. An introduction to the study of insects. Saunders College Publishing, Philadelphia, PA.
Carr, A.L. et al. 2019. Ticks home in on body heat: A new understanding of Haller's organ and repellent action. PLoS One 14(8): e0221659.
Crispell,G., S.P. et al. 2019. Discovery of alpha-gal containing antigens in North American tick species believed to induce red meat allergy. Frontiers in Immunology 10: 1056.
Curtis-Robles, R. et al. 2017. Trypanosoma cruzi (agent of Chagas disease) in sympatric human and dog populations in "Colonias" of the Lower Rio Grande Valley of Texas. American Journal of Tropical Medicine and Hygiene 96: 805-814.
Eisen, R.J. et al. 2021. Tick and tickborne pathogen surveillance as a public health tool in the United States. Journal of Medical Entomology 58: 1490-1502.
Espada, C. et al. 2021. A comparison of tick collection materials and methods in southeastern Virginia. Journal of Medical Entomology 58: 692-698.
Falco, R.C. et al. 1989. The use of carbon dioxide-baited tick traps for sampling Ixodes dammini (Acari: Ixodidae). Acarologia 30: 29-33.
Faux, J.A. et al. 1997. Sensitivity to bee and wasp venoms: association with specific IgE responses to the bee and wasp venom and HLA DRB1 and DPB1. Clinical and Experimental Allergy 27: 578-583.
Fernandez, M.P. et al. 2019. Usability and Feasibility of a Smartphone App to Assess Human Behavioral Factors Associated with Tick Exposure (The Tick App): Quantitative and Qualitative Study. JMIR Mhealth Uhealth. Oct. 2019; 7(10): e14769. Published online Oct. 24, 2019. doi: 10.2196/14769: 10.2196/14769.
Graham, C.B. et al. 2018. A molecular algorithm to detect and differentiate human pathogens infecting Ixodes scapularis and Ixodes pacificus (Acari: Ixodidae). Ticks and Tick-borne Diseases 9: 390-403.
Hebert, P.D.N. et al. 2018. A sequel to sanger: Amplicon sequencing that scales. BMC Genomics 19(1). https://doi.org/10.1186/s12864-018-4611-3.
James, M.T. et al. 1969. Herm's medical entomology, 6th ed. Macmillan, New York.
Justen, L. et al. 2021. Identification of public submitted tick images: A neural network approach. PLoS One 16(12): e0260622. https://doi.org/10.1371/journal.pone.0260622.

(Continued)

*Primary Examiner* — Jerry Lin
(74) *Attorney, Agent, or Firm* — Kyle B. Straughan; Holland & Knight LLP

(57) ABSTRACT

This invention pertains to arthropods that cause disease in humans and animals or that serve as vectors of human and animal disease-causing pathogens. It comprises a novel method, wherein acquiring, processing, identifying and determining the pathogen burden in said arthropods is integrated into a single seamless sequence that ends with the provision of data and information that can be used to improve understanding and to develop and deliver recommendations for remedial treatment of both the arthropods and humans and animals that are afflicted with disease-causing arthropods or diseases that they transmit. The novel integrated method can be offered as a unified commercial service.

9 Claims, No Drawings

(56) References Cited

OTHER PUBLICATIONS

Lindgren, B.S. 1983. A multiple funnel trap for scolytid beetles. Canadian Entomologist 115: 299-302.
Mays, S.E. et al. 2016. Comparison of novel and conventional methods of trapping ixodid ticks in the southeastern U.S.A. Medical and Veterinary Entomology 30: 123-134.
Maciel-De-Freitas, R. et al. 2006. Field evaluation of effectiveness of the BG-Sentinel, a new trap for capturing adult *Aedes aegypti* (Diptera: Culicidae). Memórias do Instituto Oswaldo Cruz 101: 321-325.
Mackay, A. et al. 2013. An improved autocidal gravid ovitrap for the control and surveillance of Aedes aegypti. Parasites and Vectors 6: 225. http://www.parasitesandvectors.com/content/6/1/225.
Meijerink, J. et al. 2000. Identification of olfactory stimulants for Anopheles gambiae from human sweat samples. Journal of Chemical Ecology 26: 1367-1381.
Mitchell, R.D. III et al. 2017. Infrared light detection by the Haller's organ of adult American dog ticks, *Dermacentor variabilis* (Ixodida: Ixodidae). Ticks and Tick-borne Diseases 8: 761-771.
Peach, D.A.H. et al. 2021. Cheese or cheese infusions—ecological traps for mosquitoes and spotted wing *Drosophila*. Pest Management Science 77: 5599-5607.
Petry, W.K. et al. 2010. A quantitative comparison of two sample methods for collecting Amblyomma americanum and Dermacentor variabilis (Acari: Ixodidae) in Missouri. Experimental and Applied Acarology 52: 427-438.
Schulze, T.L. et al. 1997. Biases associated with several sampling methods used to estimate abundance of Ixodes scapularis and Amblyomma americanum (Acari: Ixodidae). Journal of Medical Entomology 34: 615-623.
Shokralla, S. et al. 2014. Next-generation DNA barcoding: Using next-generation sequencing to enhance and accelerate DNA barcode capture from single specimens. Molecular Ecology Resources 14(5): 892-901.
Sonenshine, S. et al. 2003. Chemical composition of some components of the arrestment pheromone of the black-legged tick, *Ixodes scapularis* (Acari: Ixodidae) and their use in tick control. Journal of Medical Entomology 40: 849-859.
Takken, W. et al. 1989. Carbon dioxide and 1-octen-3-ol as mosquito attractants. Journal of the American Mosquito Control Association 5: 311-316.
Wilson, J.G. et al 1972. Chemo-attraction in the lone star tick (Acarina: Ixodidae): I. Response of different developmental stages to carbon dioxide administered via traps. Journal of Medical Entomology 9: 245-252.
Yans, M.W. et al 2022. Development of a simple trap that captures ticks (Acari) on their dorsal surface. Journal of Medical Entomology https://doi.org/10.1093/jme/tjab233.
Yoder, J.A. et al 1998. Attraction to squalene by ticks (Acari: Ixodidae): first demonstration of a host-derived attractant. International Journal of Acarology 24: 143-147.
Yuval, B. 1992. The other habit: sugar feeding by mosquitoes. Bulletin of the Society for Vector Ecology 17: 150-156.

\* cited by examiner

INTEGRATED METHOD FOR ARTHROPOD ACQUISITION, PROCESSING, IDENTIFICATION AND DETERMINATION OF PATHOGEN BURDEN

FIELD OF THE INVENTION

This invention pertains to an integrated process for acquiring, processing and identifying arthropods that cause disease in humans and animals, as well as arthropod-borne pathogens that cause disease in humans and animals and the provision and use of data and information ensuing from that process.

BACKGROUND OF THE INVENTION

Arthropods (primarily insects and ticks) are of extraordinary importance as vectors of disease-causing pathogens that impact the health of humans and animals. In the USA, ticks (Acari) transmit 18 pathogens of humans (Eisen and Paddock 2021). Mosquitoes (Diptera: Culicidae) transmit malaria, yellow fever, dengue fever Vest Nile fever, Zika virus fever and chikungunya fever among other diseases (World Health Organization 2020). In Latin America and the southern USA kissing bugs (Hemiptera: Reduviidae) transmit Chaga's disease, killing both humans and companion animals (Curtis-Robles et al. 2017). The economic impact of arthropod-borne disease can be immense. For example, medical treatments for tick-borne Lyme disease are estimated to cost $1.3 billion USD per year in the USA, with an overall impact of Lyme disease ranging from $50 billion to $100 billion (Berger et al. 2018).

Arthropods can also directly cause disease in humans and animals (Borror et al. 1989). For example, the bites or stings of bed bugs, mosquitoes, flies, yellowjackets, bees, ticks and mites can cause mild to severe systemic or local dermatitis that is sometimes very painful, and certain species of flies can mine inside the bodies of living humans and animals in a phenomenon called myiasis (James and Harwood 1969). In some cases, afflicted humans and animals can suffer severe hypersensitive (allergic) reactions, as in sweet itch of horses caused by the bites of minute ceratopogonid flies (Anderson et al. 1991), and induced allergy to red meat ($\alpha$-gal syndrome) in humans caused by bites of certain tick species (Crispell et al. 2019). Death of affected humans and animals may also occur, e.g., as a consequence of anaphylactic shock caused by the stings of wasps or bees (Faux et al. 1997).

Effective management of arthropods, the diseases they cause directly, the pathogens they may harbor, and arthropod-borne diseases is predicated on rapidly obtaining knowledge on where and when specific arthropods occur, determining the identity of the arthropod species, and identification of the pathogenic microorganisms and non-living pathogens, such as viruses, that they may harbor. The sequential process includes acquisition of an arthropod that could potentially cause disease or harbor a disease-causing pathogen, identification of said arthropod, delivering it to a laboratory capable of precisely identifying microbial pathogens and identification of said pathogens. Currently, this continuum is inefficient, unfocussed, expensive and disconnected. Deficiencies in the current state-of-the-art can be amply demonstrated using ticks as an example.

The US Centers for Disease Control and Prevention (CDC, undated) recommend flagging and dragging for acquisition of the primary tick vector of Lyme disease. This technique involves moving light-colored fabric over vegetation to collect questing ticks (Espada et al. 2021). It is time- and labor-intensive, exposes persons to ticks and tick infested habitats, may not be physically possible in some terrain or vegetation and is not easily used by private citizens. Alternatives with similar deficiencies include walking by humans through a sample area followed by examination of clothing and skin for acquired ticks, use of homemade CO2-baited sticky traps, sampling ticks on trapped or killed wild animals, removing ticks from companion animals (Eisen and Paddock 2021; Espada et al. 2021), placing a cooler containing dry ice that produces CO2 on a 1 m2 white cloth sheet (Petry et al. 2010; Mays et al. 2016), sampling litter on the forest floor and employing pitfall traps or sweep nets (Schulze et al. 1997; Mays et al. 2016). Despite early demonstration of the efficacy of using traps in place of the above methods (Wilson et al. 1972; Falco and Fish 1989), and recent demonstration that traps could be commercialized and made widely available (Yans et al. 2022), traps have not been widely adopted as an effective and inexpensive method of tick acquisition.

Often, a person who ventures into a tick habitat, which may be as close as one step beyond the door of a residence, will acquire a tick. Once found, said tick may cause immediate alarm. Has it bitten me? Could it transmit disease? Did it do so? Will I die? In contrast to professional entomologists or public health specialists who may know where to find answers to these questions, private citizens may be at a loss as to what to do and may need to expend considerable time and effort to find out. Regardless, the answers will almost invariably be found at a location remote from the place where the tick was acquired. This usually means that the tick must be shipped to one or more locations. If there is no expert taxonomist on site, who can identify the species of tick, which may be necessary to determine if it is a threat to transmit disease, a taxonomic laboratory will be the first stop in the shipping route. Alternatively, a very clear photograph or multiple photographs, can be made of the tick and sent to the taxonomist. Both methods incur additional expense and may result in delays if the required identification is not made immediately. The next stop will be a laboratory that is capable of identifying any pathogenic microbes, or non-living pathogens such as viruses, that may be harbored by said tick. Shipping requires a device in which to put the tick. Private citizens may use whatever is available, like a cigarette package or a pill vial. Professionals may reach for a Petri dish or a test tube. Almost invariably the package in which the device is put will be too bulky to fit into the mail slot of a public post box, raising the cost from $0.58 USD to $4.50 USD (2022 US Postal Service, Retail First Class Mail for a one-ounce item), or much more if rapid delivery is desired or a courier service is used.

Evaluating a tick for pathogen burden employs molecular techniques, which are currently delivered as an uncertain service. While university and government laboratories conduct genetic testing to confirm the presence of diseases in collected ticks (largely by contract), few private laboratories attempt to fulfill this need. University services may remain active only as long as competitive grant funding is sustained. Public agencies are severely limited in their capacity. For example, the CDC state that they offer limited identification services, and none for the public. Such testing can be very expensive, for example $55 USD for a single tick and pathogen (Lloyd Tick Lab, Mount Allison University, Sackville, NB, Canada, www.lloydticklab.ca/tick-testing.html). Services offered by a commercial laboratory are comparable, in one example ranging from $42 USD for a single tick and pathogen to $85 USD for a single tick and multiple pathogens (Eco Laboratory, Acton, MA, USA, ticktests.com).

Furthermore, each datum on an acquired tick or other arthropod currently exists in relative isolation. An individual or agency that has paid for information on an acquired arthropod will receive data pertaining only to that arthropod. They will not receive collective data relevant to the pest/disease threat to a community. In the USA, some data are aggregated by the CDC (cdc.gov/ncezid/dvbd/vbdelc/surveillance/index.html) but the information is essentially inaccessible to individual members of the public and is displayed well past the time of immediate risk. Although disease incidence surveillance is conducted by local, state, and territorial public health departments, data from individual disease samples are not reported, even though many of the diseases are listed on the National Notifiable Vector-Borne Disease list.

Finally, data on one arthropod group may be isolated from data on another group. For example, local mosquito control districts (MCSs) focus mainly on mosquitoes and may not consider the threat from ticks and tick-borne diseases.

A low-cost method that integrates all the above activities, or that bypasses acquisition of an arthropod by allowing entry into the process of an arthropod acquired outside of the method, is not available to any user as a commercial service.

BRIEF SUMMARY

This invention comprises a novel stepwise method that begins with acquisition of an arthropod and culminates in provision of a dataset pertaining to the identity of the arthropod, disease-causing pathogens that it may harbor, and information on potential courses of action that can be taken. Individual datasets and databases constructed by combining individual datasets have multiple uses, such as, but not limited to, subscription services to alert consumer and commercial customers of both arthropod and disease threats in real time, generation of customer leads for pharmaceutical and pest control product suppliers and providers, and utilization of large databases to construct regional summaries of arthropod and disease trends that can be used in pest and disease predictions and management. The integrated method comprises, in some embodiments, the following sequential elements: 1) employing effective traps to acquire arthropods, replacing existing collection methods with more efficient and reliable methodology, 2) placing an individual acquired arthropod into a novel miniature specialized container device suitable for inexpensive shipping by post or other methods, in which said arthropods are immersed in a non-flammable DNA/RNA-compatible preservative or preserved by desiccation, 3) a nationally standardized application (app) used to scan a unique code on the container device and into which sample, date of collection and geolocation data are entered to establish chain-of-custody for each arthropod and any pathogens it may harbor, 4) inexpensive mailing or otherwise shipping of coded container devices to a diagnostic laboratory, 5) employing automated or semiautomated processing of the samples for DNA/RNA barcoding analysis to provide inexpensive, high throughput, precise, simultaneous identification of said shipped arthropod and disease-causing pathogens that it may harbor, 6) real time automated assembly and provision to the sender via the cell phone app of information on said arthropod and pathogen identity, their potential medical and/or veterinary impact, and possible courses of action, and 7) combination of individual data sets into large databases that add additional value delivered in various forms to subscribing users, who may be individuals, vector abatement districts, regional and national health departments and commercial enterprises, such as companies that manufacture and/or sell pharmaceuticals or pest control products and services. In other embodiments, the order and/or timing of the foregoing steps may be altered depending on the specific embodiment.

DETAILED DESCRIPTION

In some embodiments, this invention is an integrated method that may be offered as a unified commercial service comprising multiple principal elements. The method comprises in part physical structures (traps and shipping container devices) and an artificial intelligence or other algorithmic software application (a software app). The method generates individual datasets for single acquired arthropods and the pathogens that they may harbor. The individual datasets can be combined to construct large databases. The sampling and analytical methodology may adhere to standards established by the CDC or other appropriate bodies and each dataset may be verified to meet criteria for inclusion in multiple databases, depending on the intended customer and use of the database. For embodiments that use the foregoing, they may ensure data transparency, facilitate inter-organizational comparisons, and will support uniform reporting for publication and outreach. The physical structures, the software application, the individual datasets and the large databases all have economic value and utility.

For some examples of the invention, the first element of the integrated method is to provide effective traps to persons or agencies desiring to acquire arthropods that cause disease directly or may be capable of harboring and transmitting one or more disease-causing pathogens. In contrast to other methods of acquiring an arthropod, which can be time- and labor-intensive, expose personnel to disease-transmitting arthropods and infested habitats, may not be physically possible in some terrain or vegetation, and may need to be synchronized with the diel activity cycle of the target arthropod, traps can be placed wherever the user desires, can be left in place over night or for multiple days, do not require continuous monitoring and can be adapted to immobilize captured arthropods for convenient processing at a later time. In other embodiments, the system and method may be configured to work with traps provided or otherwise acquired by the user through other means.

Various types of traps, as shown non-exhaustively in the following examples, can be procured or manufactured and provided to persons or agencies desiring to acquire arthropods that cause disease directly or could potentially harbor one or more disease-causing pathogens; alternatively, individuals may otherwise acquire such traps.

Examples of efficacious traps for arthropods capable of causing disease or harboring and transmitting disease-causing pathogens include the following. Among numerous traps available for mosquitoes, the CDC Light Trap (Takken and Kline 1989), the BG Sentinel Trap (Maciel-de Freitas et al. 2006) and the CDC Ovitrap (Mackay et al. 2013) stand out. Effective traps have been invented for bed bugs (Banfield and Schaafsma 2014) and flies (Kovacs et al. 2019). For ticks, recent developments suggest that a novel dorsal-capture trap would be most suitable (Yans 2018; Yans et al. 2022). Possible improvements that lower cost and improve trapping efficacy could be employing a long-lasting biotic $CO_2$ generator in place of dry ice as an attractant for mosquitoes and ticks (Birmingham et al. 2011, 2015), employing a long-lasting chemical $CO_2$ generator, developing synthetic semiochemical lures for ticks (Yoder et al. 1998; Sonenshine et al. 2003) or for mosquitoes that mimic semiochemicals emitted by plants (Yuval 1992), vertebrate hosts (Bernier et al. 2000, 2001; Meijerink et al. 2000) or larval habitats (Bentley and Day 1989), exploiting response by ticks to infrared radiation (Mitchell et al. 2017; Carr and Salgado 2019), and using an attractive hay (Bentley and Day 1989) or cheese (Peach et al. 2021) infusions to attract mosquitoes. Traps and lures would be procured or manufactured and offered to users as a first element of the seven-component method, or users may acquire specimens on their own.

Optionally, the method can be initiated by direct collection of an arthropod, e.g., removal of an arthropod from a host, such as a person or animal, without using a trap.

The second element of the method to employ a novel miniature container device in which a single acquired arthropod can be shipped inexpensively and effectively to a diagnostic laboratory. The container device is closely linked to and inseparable from the third, fourth and fifth elements of the invention. Said novel container device would rectify the alarming lack of simple and inexpensive containers for shipping arthropod specimens for biochemical analysis. The device will protect handlers from exposure to potentially risky biological samples and will enable professional persons and agencies to ship multiple arthropod samples, each in a separate device, for identification and pathogen analysis with no chance of cross contamination between samples. Each device will bear a unique, trackable serial imprint, such as a bar code or radio frequency identification (RFID) coding for end-to-end mistake-proof chain-of-custody sample tracking. In other embodiments, it may utilize an alternative form of tracking technology.

The third element of the business method is to employ a software application (app) such as the LifeScanner app (lifescanner.net ©2017 University of Guelph Center for Biodiversity Genomics, Guelph, ON, Canada), which was developed to collect, track and provide user feedback on DNA/RNA barcoding data, or an alternative software app. In some embodiments, the app is configured to run on a user's mobile device, while in others it may be on a separate device or combination of devices. The app (or equivalent) will be used to scan the bar code or RFID coding on the container device and will be suitable for user friendly entry of data, such as the date on which the arthropod was acquired and the time of acquisition, the geographic coordinates of the site at which said arthropod was acquired, information on the biotic and physical characteristics of the habitat in which the arthropod was acquired, and the identity and contact information of the collector. The app may include a required agreement that contains provisions such as, but not limited to, agreeing that the date on which the arthropod was acquired, the time of acquisition, the geographic coordinates of the site at which said arthropod was acquired, information on the biotic and physical characteristics of the habitat in which the arthropod was acquired, and the identity of the arthropod and any pathogens that it may harbor, will become the property of the administrator of the method and may be made available for entry into various databases. Users of the app will be informed that it will be used to provide real time information on the DNA/RNA barcoding data on the identity of said arthropod and any pathogens it may harbor, as well as information on their potential medical and/or veterinary impact and possible courses of action. They will also be given an option to be provided with pest control product recommendations and referral to a professional pest control company. In some embodiments, the app will make a decision based on the input information as to what information will be provided to the user and in what form the information will be provided.

The fourth element of the method, inexpensive mailing or otherwise shipping of coded container devices to a diagnostic laboratory, will employ said container device, and will be tracked by said software app. Because the arthropod (or portion thereof) within the sealed container device will be immersed in preservative or preserved by a desiccant, or otherwise preserved for later testing, any delay in shipping will not jeopardize subsequent DNA/RNA barcoding analysis. Enclosing an acquired arthropod in a sealed container device that is identified by a unique code, recording said code using a specialized software app, and not opening the sealed container device until delivery to a diagnostic laboratory enables establishment of a secure chain-of-custody for each acquired arthropod and any pathogens that it may harbor. Some embodiments may not require the mailing be necessarily inexpensive or quick due to the preservation of the sample.

The fifth element of the method, employing DNA/RNA barcoding to identify arthropods and their harbored pathogens, is a critical component that is inseparably linked to the other elements. It will replace traditional methods of biochemical molecular genetic analysis (Graham et. al. (2018). Extraction of DNA and/or RNA from submitted samples in said container devices may be semi or fully automated and may follow one of the methodologies outlined in Shokralla et al. (2014). Nucleic acid recovery may involve an automated magnetic bead-based extraction protocol modified to accommodate whole specimens and maximize DNA/RNA yield; however other methods of extraction may also be utilized depending on the needs of the embodiment. Polymerase chain reaction (PCR) amplification of barcode regions for host and pathogens will be conducted in a multi-well plate, with primer cocktails for arthropods and pathogens in separate wells. PCR products from source samples will be pooled and purified using magnetic bead-based cleanup before ligation of proven indexes and sequencing adapters (Hebert et al. 2018). A plurality of indexed and pooled samples will undergo multiplexed sequencing on an NGS Oxford Nanopore Sequencer. Sequences will be uploaded to the mBRAVE platform (Multiplex Barcode Research and Visualization Environment), where they will be filtered for quality, demultiplexed, assembled into contigs and undergo taxonomic assignment. Demultiplexed sequences will be exported and uploaded to BOLD (Barcode of Life Data Systems) with images and collection location. By directly linking available tick images to the DNA/RNA barcode for authenticating a specimen, expert identification will be provided and verified, eliminating the need for conventional taxonomic identification. In some embodiments, software algorithms and/or artificial intelligence may provide such identification, such as identifying images and comparing to known DNA/RNA barcodes.

The sixth element of the method comprises real time assembly and entry into the software app of an enabling dataset on DNA/RNA barcoding identification of each individual arthropod and any pathogens it may harbor, as well as information on their potential medical and/or veterinary impact and possible courses of action. Users will be automatically notified that the information is available on the app. If the appropriate option has been selected in the app, users will also be provided with arthropod control information, product recommendations and referral to a professional pest control company. Consumers face technical uncertainties attempting to identify suitable control products and methods that are effective and legal under local pesticide laws. They may be torn between the fear of using toxic pest control products and the need to control arthropods that can cause disease directly or vector disease-causing pathogens. The method is capable of providing high resolution and reliable data on pest and disease control strategies and tactics that will enable users to make responsible and informed decisions on effective and lawful measures that can be employed to solve their specific problem and to select reliable commercial providers of the appropriate service. The subscribing sender and user of the enabling information may be individual members of the public, professional persons, commercial firms, non-profit organizations, or government service agencies, or other individuals with a need for arthropod and pathogen identification.

The seventh element of the method comprises combining individual datasets into large databases that have not previously been available at the scope and resolution made possible by adoption of the method. Datasets sourced from the crowd of individual, professional, commercial and public users will be sorted and assembled into databases as requested by a client. One example could be a request for national data on the geographic and temporal occurrence of a specific native or invasive arthropod or pathogen. Another could be a request for a database that associates an arthropod or pathogen with specific biotic and physical habitat characteristics. A third example could be provision of a database on the arthropod and disease threat that pertains to a local area, e.g., a county, a municipality, a military base or a national park. All the above examples, and others, could provide information pertaining to business decisions, such as estimating the demand for pharmaceutical products or pest control products and services. Using ticks as an example, because the sampling and analytical methodology will adhere to standards established by the CDC or other regulatory agencies, the databases and the individual datasets comprising them will be suitable for transfer and entry by a client into public databases like TickIDNet (github.com/lennijusten/TickIDNet) (Justen et al. 2021), The Tick App (thetickapp.org/) (Fernandez et al. 2019), TickTracker App (livlymefoundation.org/ticktracker-app/) and the Vermont Tick Tracker" (apps.health.vermont.gov/vttracking/ticktracker/2019/d/index.html).

The method has high commercial value. Individual members of the public, professional persons, non-profit organizations, government agencies and commercial firms may be able to purchase the method, and thus be provided with the tools to conduct arthropod pest surveillance on their own. If they opt for the entire method, they will receive traps that have been scientifically proven to be effective for specific arthropods, and a specialized inexpensive container device in which to ship individual acquired arthropods to a diagnostic laboratory. If they acquire an arthropod through a method other than trapping, they will be able to opt into the method at the second element, i.e., placing the arthropod into said specialized container device for shipment to a diagnostic laboratory. They will enter information on the acquired arthropod, as well as the unique code on each container device, into a specialized cell phone app, which will provide assured chain-of-custody for each individual arthropod and any pathogens it may harbor through the entire shipping and diagnostic service. In turn, they will receive via the cell phone app real time reliable information provided by DNA/RNA barcoding on the identity of the acquired arthropod and any pathogens that it may harbor, as well as information on the risk and impact of disease that could be caused by the arthropod directly or by any pathogens that it harbors. They will also be provided with available information on potential courses of action that they may be able to take on their own, or which will provide them with the resources to make informed decisions when seeking commercial pest control services. Professional persons in a consulting role will be able to provide said information to their clients.

Some commercial firms may act as distributors, who vendor the service to individual members of the public, professional persons, non-profit organizations, commercial firms and government agencies. Commercial pest control service companies may act as add-on distributors, who vendor the service to users, and in addition offer specialized pest control advice or control measures. For instance, a pest control service company could use local data to inform customers of seasonal risks that would lead to timely and effective treatment, e.g., springtime spraying to control questing ticks, or to use the data for a focused sales promotion that is supported by an actual risk index.

Government public health agencies like the CDC currently conduct arthropod and disease surveillance operations, that are limited by available budgets, resources and outdated methodology. The method will deliver improved and standardized methodology to clients. Moreover, by accessing the entire collection of datasets from all users, the business method will be capable of generating tailored and targeted databases that are orders of magnitude greater than those that could be generated by a single entity on its own. Public health agencies, and potentially other users, such as non-profit organizations, pharmaceutical companies and pest control product manufacturers and service companies, would be able to submit requests for and to purchase large databases that meet their specific needs. These large databases would in turn be used to generate new or improved commercial products and services and to implement more effective large-scale arthropod and disease management programs that reduce the threat of disease and improve public health.

It will be appreciated that the scope of the present invention is not limited to the above-described embodiments, but rather is defined by the appended claims, and these claims will encompass modifications of and improvements to what has been described.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

The foregoing examples should be viewed as demonstrations of potential embodiments and are not exhaustive or necessarily conclusive as to the effectiveness of the present invention. In many situations, it may be preferable to utilize mixtures and conditions different from the above or use an embodiment of the invention which an example may have indicated was less effective but may be more optimal in such situation.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application. Many changes, modifications, variations and other uses and applications of the present construction will, however, become apparent to those skilled in the art after considering the specification and the accompanying figures. All such changes, modifications, variations and other uses and applications which do not depart from the spirit and scope of the invention are deemed to be covered by the invention which is limited only by the claims which follow.

It should be understood that while certain preferred forms, embodiments, and examples of this invention have been illustrated and described, the present invention is not to be limited to the specific forms or arrangement of parts described and shown, and that the various features described may be combined in other ways than those specifically described without departing from the scope of the present invention.

REFERENCES CITED

U.S. Patent Documents

Banfield, M. G. and E. J. Schaafsma. 2014. Bed bug attractants and methods. U.S. Pat. No. 8,808,721.

Bernier, U. R., D. L. Kline, D. R. Barnard, K. H. Posey, M. M. Booth and R. A. Yost. 2001. Chemical composition that attract mosquitoes. U.S. Pat. No. 6,267,953.

Birmingham, A. L., I. S. Andreller, E. Kovacs, J.-P. Lafontaine, G. Gries, A. Vaudry and J. H. Borden. 2015. Method and composition for attracting fruit flies to traps. U.S. Pat. No. 8,940,287.

Kovacs, E., A. L. Vaudry, M. L. Foster and J. H. Borden. 2019. Window fly trap. U.S. Pat. No. 10,299,470.

Lidgard, G. P., M. J. Domanico, K. Fourier, J. P Light II, S. Castanon and K. Kopitzke. 2020. Sample collection device. U.S. Pat. No. 10,702,250.

Yans, M. W. 2018. Modular insect trap. U.S. Pat. No. 10,098,337.

OTHER PUBLICATIONS

Anderson, G. S., P. Belton and N. Kleider. 1991. *Culicoides obsoletus* as a causal agent of culicoides hypersensitivity (sweet itch) in horses in British Columbia. Journal of Medical Entomology 28:685-693.

Bentley, M. D. and J. F. Day. 1989. Chemical ecology and behavioral aspects of mosquito oviposition. Annual Review of Entomology 34:402-421.

Berger, J. J., B. K. Hayes, J. N. Aucott, K. T. Honey, W. A. Adams, C. B. Beard, S. Cooper, D. M. Dixon, R. I. Horowitz, R. Smith, E. Jones, L. E. Nigrovic, A. L. Richards, R. Sabatino, V. M. Singh and P. V. Smith. 2018. Tick-Borne Disease Working Group: 2018 Report to Congress. U.S. Department of Health and Human Services, Office of the Assistant Secretary for Health, Washington, DC.

Bernier, U. R., D. L. Kline, D. R. Barnard, C. E. Schreck and R. A. Yost. 2000. Analysis of human skin emanations by gas chromatography/mass spectrometry. 2. Identification of volatile compounds that are candidate attractants for the yellow fever mosquito (*Aedes aegypti*). Analytical Chemistry 72:747-756.

Birmingham, A. L., E. Kovacs, J. P. Lafontaine, N. Avelino, J. H. Borden, I. Andreller and G. Gries. 2011. A new trap and lure for *Drosophila melanogaster* Meigen (*Diptera*: Drosophilidae). Journal of Economic Entomology 104: 1018-1023.

Borror, D. J., C. A. Triplehorn and N. F. Johnson. 1989. An introduction to the study of insects. Saunders College Publishing, Philadelphia, PA.

Carr, A. L. and V. L. Salgado. 2019. Ticks home in on body heat: A new understanding of Haller's organ and repellent action. PLOS ONE 14(8): e0221659.

Crispell, G., S. P. Commins, S. A. Archer-Hartman, S. Choudhary, G. Dharmarajan, P. Azadi and S. Karim. 2019. 5661.002

Curtis-Robles, R., I. B. Zecca, V. Roman-Cruz, E. S. Carbajal, L. D. Auckland, I. Flores, A. V. Millard and S. A. Hamer. 2017. *Trypanosoma cruzi* (agent of Chagas disease) in sympatric human and dog populations in "Colonias" of the Lower Rio Grande Valley of Texas. American Journal of Tropical Medicine and Hygiene 96:805-814.

Eisen, R. J. and C. D. Paddock. 2021. Tick and tickborne pathogen surveillance as a public health tool in the United States. Journal of Medical Entomology 58:1490-1502.

Espada, C., H. Cummins, J. A. Gonzales, L. Notto and H. D. Gaff. 2021. A comparison of tick collection materials and methods in southeastern Virginia. Journal of Medical Entomology 58:692-698.

Falco, R. C. and D. Fish. 1989. The use of carbon dioxide-baited tick traps for sampling *Ixodes dammini* (Acari: Ixodidae). Acarologia 30:29-33.

Faux, J. A., M. F. Moffatt, A. Lalvani, J. Dekker, D. A. Warrell and W. O. Cookson. 1997. Sensitivity to bee and wasp venoms: association with specific IgE responses to the bee and wasp venom and HLA DRB1 and DPB1. Clinical and Experimental Allergy 27:578-583.

Fernandez, M. P., G. M. Bron, P. A. Kache, S. R. Larson, A. Maus, D. Gustafson Jr., J. I. Tsao, L. C. Bartholomay, S. M. Paskewitz and M. A. Diuk-Wasser. 2019. Usability and Feasibility of a Smartphone App to Assess Human Behavioral Factors Associated with Tick Exposure (The Tick App): Quantitative and Qualitative Study. JMIR Mhealth Uhealth. 2019 October; 7(10): e14769. Published online 2019 Oct. 24. doi: 10.2196/14769:10.2196/14769.

Graham, C. B., S. E. Maes, A. Hojgaard, A. C. Fleshman, S. W. Sheldon and R. J. Eisen. 2018. A molecular algorithm to detect and differentiate human pathogens infecting *Ixodes scapularis* and *Ixodes pacificus* (Acari: Ixodidae). Ticks and Tick-borne Diseases 9:390-403.

Hebert, P. D. N., T. W. A. Braukmann, S. W. J. Prosser, S. Ratnasingham, J. R. deWaard, N. V. Ivanova, D. H. Janzen and E. V. Zakharov. 2018. A sequel to sanger: Amplicon sequencing that scales. BMC Genomics 19(1). doi.org/10.1186/s12864-018-4611-3.

James, M. T. and R. F. Harwood. 1969. Herm's medical entomology, 6th ed. Macmillan, New York.

Justen L, D. Carlsmith, S. M. Paskewitz, L. C. Bartholomay and G. M. Bron. 2021. Identification of public submitted tick images: A neural network approach. PLOS ONE 16(12): e0260622. doi.org/10.1371/journal.pone.0260622.

Lindgren, B. S. 1983. A multiple funnel trap for scolytid beetles. Canadian Entomologist 115:299-302.

Mays, S. E., A. E. Houston and R. T. Trout Fryxell. 2016. Comparison of novel and conventional methods of trapping ixodid ticks in the southeastern U.S.A. Medical and Veterinary Entomology 30:123-134.

Maciel-de-Freitas, R., A. E. Eiras and R. Lourenço-de-Oliveira. 2006. Field evaluation of effectiveness of the BG-Sentinel, a new trap for capturing adult *Aedes aegypti* (*Diptera*: Culicidae). Memórias do Instituto Oswaldo Cruz 101:321-325.

Mackay, A., M. Amador and R. Barrera. 2013. An improved autocidal gravid ovitrap for the control and surveillance of *Aedes aegypti*. Parasites and Vectors 6:225. http://www.parasitesandvectors.com/content/6/1/225.

Meijerink, J., M. A. H. Braks, A. A. Brack, W. Adam, T. Dekker, M. A. Posthumus, T. A. van Beek and J. J. A. van Loon. 2000. Identification of olfactory stimulants for *Anopheles gambiae* from human sweat samples. Journal of Chemical Ecology 26:1367-1381.

Mitchell, R. D. III, J. Zhua, A. L. Carr, A. Dhammia, G. Cavea, D. E. Sonenshine and R. M. Roe. 2017. Infrared light detection by the Haller's organ of adult American dog ticks, *Dermacentor variabilis* (Ixodida: Ixodidae). Ticks and Tick-borne Diseases 8:761-771.

Peach, D. A. H., M. Almond, E. Ko, S. Meraj, R. Gries and G. Gries. 2021. Cheese or cheese infusions-ecological traps for mosquitoes and spotted wing *drosophila*. Pest Management Science 77:5599-5607.

Petry, W. K., S. A. Fore, L. J. Fielden and H-J. Kim. 2010. A quantitative comparison of two sample methods for collecting *Amblyomma americanum* and *Dermacentor variabilis* (Acari: Ixodidae) in Missouri. Experimental and Applied Acarology 52:427-438.

Schulze, T. L., R. A. Jordan and R. W. Hung. 1997. Biases associated with several sampling methods used to estimate abundance of *Ixodes scapularis* and *Amblyomma americanum* (Acari: Ixodidae). Journal of Medical Entomology 34:615-623.

Shokralla, S., J. F. Gibson, H. Nikbakht, D. H. Janzen, W. Hallwachs and M. Hajibabaei. 2014. Next-generation DNA barcoding: Using next-generation sequencing to enhance and accelerate DNA barcode capture from single specimens. Molecular Ecology Resources 14(5): 892-901.

Sonenshine, D. E., T. Adams, S. A. Allan, J. Mclaughlin and F. X. Webster. 2003. Chemical composition of some components of the arrestment pheromone of the black-legged tick, *Ixodes scapularis* (Acari: Ixodidae) and their use in tick control. Journal of Medical Entomology 40:849-859.

Takken, W. and D. L. Kline. 1989. Carbon dioxide and 1-octen-3-ol as mosquito attractants. Journal of the American Mosquito Control Association 5:311-316.

US Centers for Disease Control. Undated. Surveillance for *Ixodes scapularis* and pathogens found in this tick species in the United States. www.cdc.gov/ticks/resources/Tick-Surveillance_Iscapularis-P.pdf.

Wilson, J. G., D. R. Kinzer, J. R. Sauer and J. A. Hair. 1972. Chemo-attraction in the lone star tick (*Acarina*: Ixodidae): I. Response of different developmental stages to carbon dioxide administered via traps. Journal of Medical Entomology 9:245-252.

World Health Organization. 2020. Vector-borne diseases: fact sheet. www.who.int/news-room/fact-sheets/detail/vector-borne-diseases.

Yans, M. W., A. S. Branca, N. G. Hahn, S. E. Crawley, A. C. Figurskey, K. R. Hobson, M. G. Banfield and J. H. Borden. 2022. Development of a simple trap that captures ticks (Acari) on their dorsal surface. Journal of Medical Entomology doi.org/10.1093/jme/tjab233.

Yoder. J. A., A. D. Atwood and B. W. Stevens. 1998. Attraction to squalene by ticks (Acari: Ixodidae): first demonstration of a host-derived attractant. International Journal of Acarology 24:143-147.

Yuval. B. 1992. The other habit: sugar feeding by mosquitoes. Bulletin of the Society for Vector Ecology 17:150-156.

What is claimed is:

1. A method of collecting, processing, and determination of the species of acquired ticks that cause disease directly to humans or animals, or serve as vectors of human and animal disease-causing pathogens that they harbor, as well as identification of said pathogens, that can be offered as a unified commercial service, wherein the method comprises the following elements:

capturing a tick;

placing the tick into a substantially flat container device wherein said container device has at least one dimension that is thinner than one half of an inch, has a unique code associated with said container device, and said tick is immersed in a non-flammable DNA/RNA compatible preservative or is preserved in dry form by a desiccant;

having a user scan a unique code on the container device using a software application and device configured with a scanner configured to scan the unique code, wherein the user also inputs information regarding the geolocation the tick was captured in into the software application;

providing the container device to a diagnostic laboratory;

pairing the unique code of the container device with the tick inside the container device;

using DNA/RNA barcoding to determine whether the tick in the container device is carrying any pathogens;

uploading the results of the DNA/RNA barcoding of the tick to a database;

providing the user data concerning said tick and pathogen identity, the diseases caused by the pathogens, and possible courses of action through the software application; and combining a plurality of individual tick datasets into an aggregated dataset.

2. The method of claim 1, wherein the step of capturing the tick is performed using a trap.

3. The method of claim 1, wherein the trap is a dorsal-capture trap.

4. The method of claim 1, wherein the species of target ticks can include, but are not limited to, *Amblyomma americanum, Amblyomma maculatum, Dermacentor variabilis, Dermacentor andersoni, Dermacentor occidentalis, Haemaphysalis longicornis, Ixodes scapularis, Ixodes pacificus,* and *Rhipicephalus sanguineus*.

5. The method of claim 1, wherein the pathogens harbored by target ticks can include, but are not limited to, *Borrelia burgdorferi, Borrelia mayonii, Borrelia miyamotoi, Anaplasma phagocytophilum, Ehrlichia chaffeensis, Ehrlichia ewingii, Ehrlichia canis, Ehrlichia muris* eauclairensis, *Francisella tularensis, Rickettsia rickettsii, Rickettsia parkeri, Rickettsia* 364D, *Rickettsia philipii, Rickettsia amblyommatis, Candidatus rickettsia* andeanae, *Theileria orientalis*, Bourbon virus, Heartland virus, and Powassan virus.

6. The method of claim 1, wherein the steps of capturing a tick, placing the tick, having the user, providing the container, pairing the unique code, uploading the results, and providing the user data are repeated a plurality of times.

7. The method of claim 6, wherein there are at least two users and at least two ticks.

8. The method of claim 1, wherein the tick is captured substantially alive and intact.

9. A method of collecting, processing, and determination of the species of acquired ticks that cause disease directly to humans or animals, or serve as vectors of human and animal disease-causing pathogens that they harbor, as well as identification of said pathogens, that can be offered as a unified commercial service, wherein the method comprises the following elements:

capturing a tick;

placing the tick into a container wherein said container has a unique code associated with said container device, and said tick is immersed in a preservative or is preserved in dry form by a desiccant;

having a user scan a unique code on the container device using a software application and device configured with a scanner configured to scan the unique code, wherein the user or software application also inputs information regarding the geolocation the tick was captured in into the software application;

pairing the unique code of the container device with the tick inside the container device;

determining whether the tick in the container device is carrying any pathogens;

uploading the results of the determination step and the associated geolocation of the tick to a database; and combining a plurality of individual tick datasets into an aggregated dataset.

\* \* \* \* \*